United States Patent
Le et al.

(10) Patent No.: US 8,891,202 B2
(45) Date of Patent: Nov. 18, 2014

(54) NOTCHED DISK CLAMP

(71) Applicant: Seagate Technology LLC, Cupertino, CA (US)

(72) Inventors: Lynn Bich-Quy Le, San Jose, CA (US); Hans Leuthold, Santa Cruz, CA (US); Troy M. Herndon, San Jose, CA (US); Paco Gregor Flores, Felton, CA (US); Matthew M. McConnell, Scotts Valley, CA (US)

(73) Assignee: Seagate Technology LLC, Cupertino, CA (US)

( * ) Notice: Subject to any disclaimer, the term of this patent is extended or adjusted under 35 U.S.C. 154(b) by 13 days.

(21) Appl. No.: 13/853,895

(22) Filed: Mar. 29, 2013

(65) Prior Publication Data

US 2014/0293480 A1    Oct. 2, 2014

(51) Int. Cl.
*G11B 17/08*    (2006.01)
*G11B 17/028*    (2006.01)

(52) U.S. Cl.
CPC ................. *G11B 17/0284* (2013.01)

USPC ........................................ 360/98.08

(58) Field of Classification Search
CPC ....................................... G11B 17/038
USPC ........ 360/98.08, 99.05, 99.12; 720/604, 605, 720/706–714; 369/30.95, 30.96, 270.1
See application file for complete search history.

(56) References Cited

U.S. PATENT DOCUMENTS

| | | | |
|---|---|---|---|
| 5,486,961 A * | 1/1996 | Boutaghou et al. | 360/99.12 |
| 6,282,054 B1 * | 8/2001 | Luo | 360/98.08 |
| 6,417,988 B1 | 7/2002 | Renken et al. | |
| 7,379,267 B2 | 5/2008 | Engesser et al. | |
| 7,823,270 B2 | 11/2010 | Choo et al. | |
| 8,069,554 B2 | 12/2011 | Ruden et al. | |

\* cited by examiner

*Primary Examiner* — Adam R Giesy
*Assistant Examiner* — Gustavo Polo

(57) ABSTRACT

Provided herein is an apparatus, including a plurality of disk clamp notches spaced about an outer lip of an annular disk clamp; an annular groove in an outer perimeter of a hub; and a mounting point on the hub for at least one disk, wherein the annular disk clamp occupies the annular groove of the hub, clamping the at least one disk onto the hub at the mounting point for the at least one disk.

20 Claims, 2 Drawing Sheets

NOTCHED DISK CLAMP

BACKGROUND

A hard disk drive ("HDD") includes one or more disks for storing digital data, which one or more disks are clamped to a spindle motor assembly for rotation during read-write operations. The conventional, screw-based disk clamp that is used to clamp the one or more disks to the spindle motor assembly requires a dedicated space for the clamp and the one or more screws used to fasten the disks to the spindle motor assembly. The height of the dedicated space required for the screw-based disk clamp takes an amount of length away from the bearing span of the spindle.

SUMMARY

Provided herein is an apparatus, including a plurality of disk clamp notches spaced about an outer lip of an annular disk clamp; an annular groove in an outer perimeter of a hub; and a mounting point on the hub for at least one disk, wherein the annular disk clamp occupies the annular groove of the hub, clamping the at least one disk onto the hub at the mounting point for the at least one disk.

These and other aspects and features of the invention may be better understood with reference to the following drawings, description, and appended claims.

DRAWINGS

Figure 1:
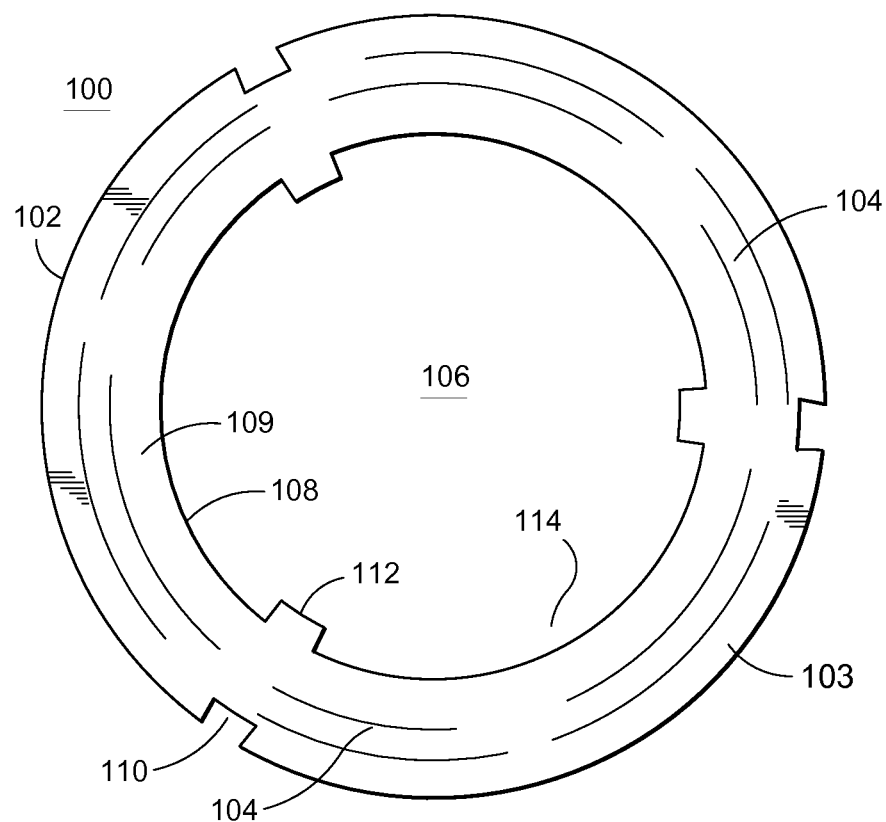

FIG. 1 provides a disk clamp in accordance with an embodiment.

Figure 2:
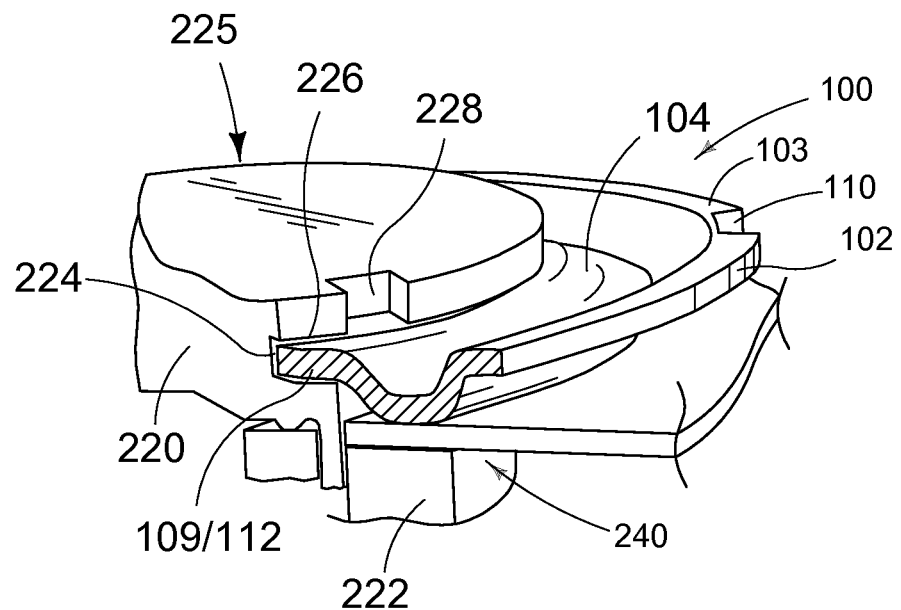

FIG. 2 provides a disk clamp clamping a disk onto a hub in accordance with an embodiment.

Figure 3:
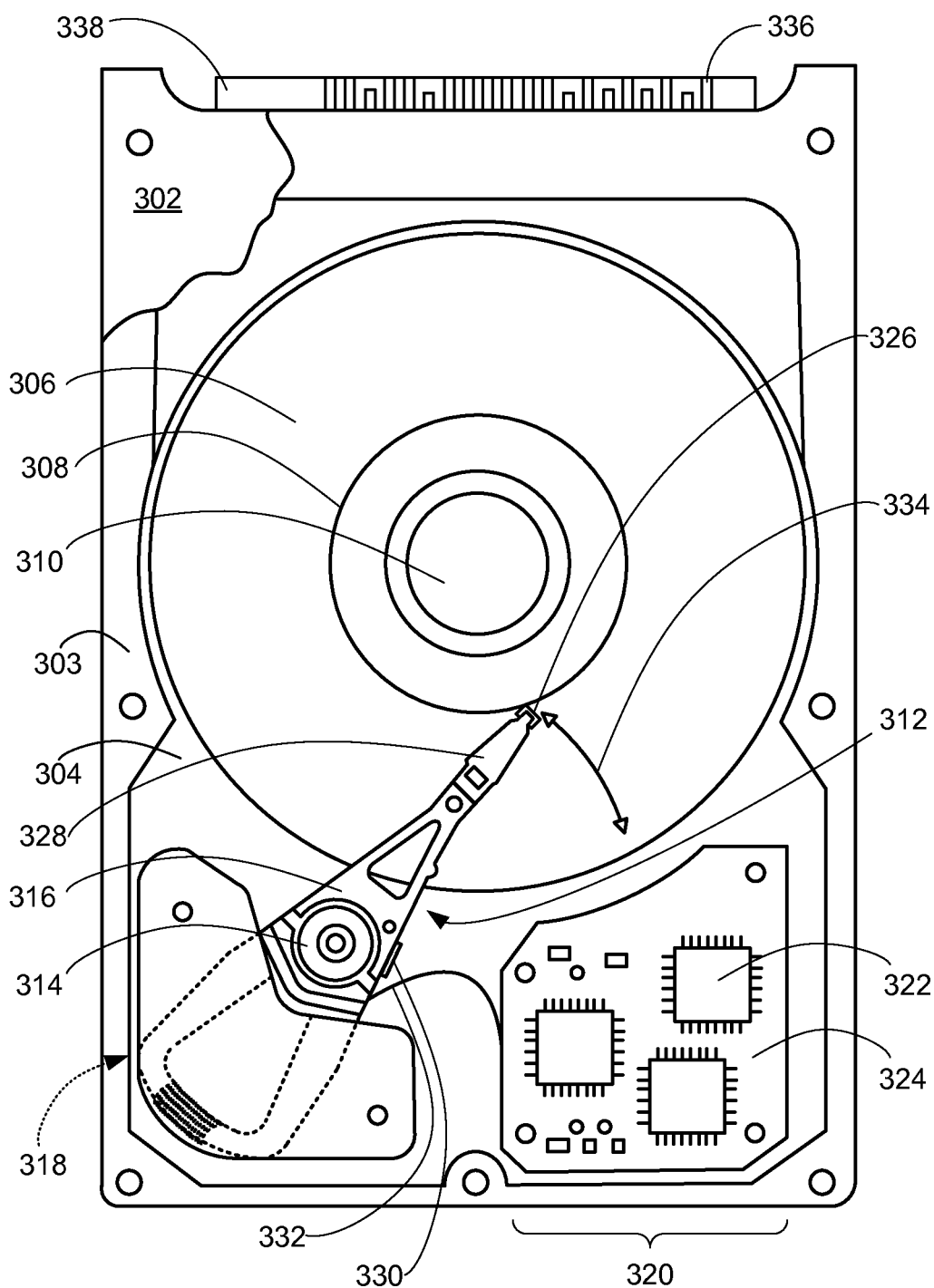

FIG. 3 provides a conventional HDD in which embodiments of one or more disk clamps may be used.

DESCRIPTION

Before embodiments of the invention are described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements that may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing embodiments of the invention, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the claimed invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like, are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

Embodiments of the invention will now be described in greater detail.

Conventional HDDs (e.g., FIG. 9 and accompanying description herein below) typically include one or more data storage disks supported on a hub for rotation by a spindle motor assembly. The one or more data storage disks each have a central opening defining an inner diameter through which a spindle of the spindle motor assembly extends. Each disk is secured at its inner diameter to the hub in a fixed relation with the spindle, and each disk is supported such that its outer diameter is free from contact with other components. When the spindle is rotatably driven by the spindle motor, the one or more data storage disks rotate with the spindle.

In securing the one or more data storage disks to the hub, the disks are alternately stacked with spacer rings on the hub, defining the core of the disk stack. The disks of the disk stack are typically secured onto the hub by a disk clamp that fits over the top of the hub. Conventional HDDs typically use a screw-based disk clamp to secure the one or more data storage disks of the disk pack in place on the hub. The height of the dedicated space required for the screw-based disk clamp takes an amount of length away from the bearing span of the spindle, height that could instead be used to increase bearing span and, thus, gyro performance. Described herein are various embodiments of disk clamps that do not require screws and/or reclaim height-based space increasing bearing span.

In some embodiments, a disk clamp in accordance with FIG. 1 is provided to secure a disk onto a hub without a separate fastener (e.g., screw). As shown in FIG. 1, the disk clamp may comprise an annular disk clamp 100 having an outer perimeter 102, an outer lip 103, an inner annulus 104, an inner opening 106, and an inner perimeter 108 of the inner opening. In some embodiments, the disk clamp may comprise a material having a relatively low thermal expansion coefficient. In some embodiments, the disk clamp may comprise a material having a relatively low thermal expansion coefficient from about 5° C. to about 60° C., the normal operating range for HDDs. In such embodiments, the disk clamp may comprise aluminum or steel.

The disk clamp may comprise a plurality of flanges 112 and voids 114 spaced about the inner perimeter of the disk clamp, which flanges are designed to occupy an annular groove of the hub. While the space occupied by each of the flanges about the inner perimeter of the disk clamp of FIG. 1 is shown to be small with respect to the space occupied by the each of the voids about the inner perimeter of the disk clamp, the size of the flanges (and voids) may vary. For example, in some embodiments, the space occupied by each of the flanges about the inner perimeter of the disk clamp is about equal to the space occupied by the each of the voids about the inner perimeter of the disk clamp. In some embodiments, the space occupied by each of the flanges about the inner perimeter of the disk clamp is greater than the space occupied by the each of the voids about the inner perimeter of the disk clamp. In such embodiments, the flanges 112 may be considered to comprise an inner lip 109 (see FIG. 2) of the disk clamp, and the voids 114 may be considered cut-outs or notches in the inner lip. While the number of flanges about the inner perimeter of the disk clamp in FIG. 1 is shown to be three, the number of flanges (and voids) may be different. For example, the number of flanges (and voids) about the inner perimeter of the disk clamp may be greater than three. In some embodiments, the inner perimeter of the disk clamp comprises at least 3, 4, 5, 6, 7, 8, 9, 10, 11, or 12 flanges, which flanges alternate with an equal number of voids.

The outer lip 103 may comprise a plurality of cut-outs or notches 110 such that a tool, designed to interface with the notched outer lip of the disk clamp, may be used to install (or remove) the disk clamp. In some embodiments, the outer lip of the disk clamp comprises at least 3, 4, 5, 6, 7, 8, 9, 10, 11, or 12 notches. In such embodiments, the inner perimeter of the disk clamp may have a number of flanges (or voids) equal to the number of notches in the outer lip, a number of flanges (or voids) greater than the number of notches in the outer lip, or a number of flanges (or voids) fewer than the number of notches in the outer lip.

The disk clamp 100 of FIG. 1, which clamp is operable to apply a load onto an inner annulus of a disk and clamp one or more disks onto a hub, may have a loaded form and a pre-loaded form. The loaded form includes the form the disk clamp takes when the disk clamp is clamping one or more disks onto a hub and when the disk clamp stands alone (i.e., in a free state). The pre-loaded form includes the form the disk clamp takes when the disk clamp is held by the tool that interfaces with the notches of the outer lip of the disk clamp. In the pre-loaded form, the tool holds and maintains tension on the disk clamp, supplying a load on an inner portion of the disk clamp such as on the flanges, inner perimeter, and/or inner annulus of the disk clamp. Alternatively, the tool holds and maintains tension on the disk clamp by drawing the outer perimeter, outer lip, and/or inner annulus up toward the tool and out of the place in which the outer perimeter, outer lip, and/or inner annulus, respectively, normally reside in the loaded form. Having the disk clamp in pre-loaded form helps prevent the rubbing contact between the disk clamp and the disk and/or the hub that might otherwise occur when the disk clamp is installed. Given the foregoing, the disk clamp may be a compliant disk clamp, at least to the extent needed for installing the disk clamp with minimal rubbing contact.

The disk clamp 100 of FIG. 1 is shown in FIG. 2 securing a disk 240 onto a hub 220 without a separate fastener (e.g., screw). As shown in FIG. 2, the hub comprises an annular groove 224 designed to accommodate the flanges 112 of the disk clamp, wherein the annular groove is located in an outer perimeter of the hub, above a mounting point 222 for the disk and below the topmost portion of the hub 225. The outer perimeter of the hub at the topmost portion of the hub further comprises alternating flanges 226 and voids 228. Such alternating hub flanges and hub voids allow for the disk clamp to be fitted over the hub, wherein disk clamp flanges 112 match up with hub voids 228, and wherein hub flanges 226 match up with disk clamp voids 114. As further shown in FIG. 2, inner annulus 104 of the disk clamp comprises an annular trough, the bottom of which sits below each of the outer lip 103/outer perimeter 102 and the inner perimeter 108 of the disk clamp, and the bottom of which directly contacts an inner annulus 142 of the disk, clamping the disk to the hub at the mounting point 122.

With respect to the installation (or removal) tool designed to interface with the notches 110 of the outer lip 103 of the disk clamp 100, the tool is operable to pick up the disk clamp, put the disk clamp onto the hub, and/or turn the disk clamp into a locking position on the hub, optionally, while holding the disk clamp in a pre-loaded form, which form helps prevent the rubbing contact between the disk clamp and the disk that might otherwise occur. The tool may have a number of teeth equal to the number of notches in the outer lip of the disk clamp, or the tool may have a fewer number of teeth than the disk clamp has notches, which fewer number of teeth may allow the tool to interface with additional types of disk clamps that may have different notch arrangements.

With respect to clamping a disk to a hub using the disk clamp of FIG. 1A and/or FIG. 1B, such clamping comprises, in some embodiments, lowering the disk to be clamped over the topmost portion of the hub and onto the mounting point of the hub; matching hub flanges and hub voids with disk clamp voids and disk clamp flanges, respectively; lowering the disk clamp over the topmost portion of the hub and into an annular groove in the outer perimeter of the hub; and turning the disk clamp in the annular groove to clamp the disk to the hub at the mounting point. The foregoing clamping may further comprise holding the disk clamp in a pre-loaded form while maneuvering the disk clamp into position, and releasing the disk clamp form the pre-loaded form to clamp the disk clamp to the hub at the mounting point. With respect to unclamping and removing a disk from a hub, such unclamping and removing comprises, in some embodiments, turning the disk clamp in the annular groove to unclamp the disk from the hub; matching hub flanges and hub voids with disk clamp voids and disk clamp flanges, respectively; raising the disk clamp over the topmost portion of the hub to remove the disk clamp; and raising the disk over the topmost portion of the hub to remove the disk.

FIG. 3 is a plan view of a hard disk drive 300, which hard disk drive may use the a disk clamp described herein. Hard disk drive 300 may include a housing assembly comprising a cover 302 that mates with a base deck having a frame 303 and a floor 304, which housing assembly provides a protective space for various hard disk drive components. The hard disk drive 300 includes one or more data storage disks 306 of computer-readable data storage media. Typically, both of the major surfaces of each data storage disk 306 include a plurality of concentrically disposed tracks for data storage purposes. Each data storage disk 306 is mounted on a hub 308, which in turn is rotatably interconnected with the base deck and/or cover 302. Multiple data storage disks 306 are typically mounted in vertically spaced and parallel relation on the hub 308. A spindle motor assembly 310 rotates the data storage disks 306.

The hard disk drive 300 also includes an actuator arm assembly 312 that pivots about a pivot bearing 314, which in turn is rotatably supported by the base deck and/or cover 302. The actuator arm assembly 312 includes one or more individual rigid actuator arms 316 that extend out from near the pivot bearing 314. Multiple actuator arms 316 are typically disposed in vertically spaced relation, with one actuator arm 316 being provided for each major data storage surface of each data storage disk 306 of the hard disk drive 300. Other types of actuator arm assembly configurations could be utilized as well, an example being an "E" block having one or more rigid actuator arm tips, or the like, that cantilever from a common structure. Movement of the actuator arm assembly 312 is provided by an actuator arm drive assembly, such as a voice coil motor 318 or the like. The voice coil motor 318 is a magnetic assembly that controls the operation of the actuator arm assembly 312 under the direction of control electronics 320. The control electronics 320 may include a plurality of integrated circuits 322 coupled to a printed circuit board 324. The control electronics 320 may be coupled to the voice coil motor assembly 318, a slider 326, or the spindle motor assembly 310 using interconnects that can include pins, cables, or wires (not shown).

A load beam or suspension 328 is attached to the free end of each actuator arm 316 and cantilevers therefrom. Typically, the suspension 328 is biased generally toward its corresponding data storage disk 306 by a spring-like force. The slider 326 is disposed at or near the free end of each suspension 328. What is commonly referred to as the read-write head (e.g., transducer) is appropriately mounted as a head unit (not shown) under the slider 326 and is used in hard disk drive read/write operations. The head unit under the slider 326 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 326 is connected to a preamplifier 330, which is interconnected with the control electronics 320 of the hard disk drive 300 by a flex cable 332 that is typically mounted on the actuator arm assembly 312. Signals are exchanged between the head unit and its corresponding data storage disk 306 for hard disk drive read/write operations. In this regard, the voice coil motor 318 is utilized to pivot the actuator arm assembly 312 to simultaneously move the slider 326 along a path 334 and across the corresponding data storage disk 306 to position the head unit at the appropriate position on the data storage disk 306 for hard disk drive read/write operations.

When the hard disk drive 300 is not in operation, the actuator arm assembly 312 is pivoted to a "parked position" to dispose each slider 326 generally at or beyond a perimeter of its corresponding data storage disk 306, but in any case in vertically spaced relation to its corresponding data storage disk 306. In this regard, the hard disk drive 300 includes a ramp assembly (not shown) that is disposed beyond a perimeter of the data storage disk 306 to both move the corresponding slider 326 vertically away from its corresponding data storage disk 306 and to also exert somewhat of a retaining force on the actuator arm assembly 312.

Exposed contacts 336 of a drive connector 338 along a side end of the hard disk drive 300 may be used to provide connectivity between circuitry of the hard disk drive 300 and a next level of integration such as an interposer, a circuit board, a cable connector, or an electronic assembly. The drive connector 338 may include jumpers (not shown) or switches (not shown) that may be used to configure the hard disk drive 300 for user specific features or configurations. The jumpers or switches may be recessed and exposed from within the drive connector 338.

As such, provided herein is an apparatus, comprising a plurality of disk clamp flanges spaced about an inner perimeter of an inner opening of an annular disk clamp; a plurality of disk clamp notches spaced about an outer lip of the annular disk clamp; a plurality of hub flanges alternating with hub voids on a top portion of the outer perimeter of the hub, operable to accommodate placement of the annular disk clamp; an annular groove in the outer perimeter of the hub; and a mounting point on the hub for at least one disk, wherein the plurality of disk clamp flanges occupy the annular groove of the hub, clamping the at least one disk onto the hub at the mounting point for the at least one disk. In some embodiments, the plurality of hub voids align with the plurality of disk clamp flanges to allow for the annular disk clamp to be inserted over the top portion of the hub and the flanges into the annular groove of the hub. In some embodiments, the number of hub voids is greater than or equal to the number of disk clamp flanges. In some embodiments, the number of hub voids is equal to the number of disk clamp flanges. In some embodiments, the number of hub voids and the number of disk clamp flanges is at least three. In some embodiments, the plurality of disk clamp notches align with a plurality of teeth of a tool for manipulating the disk clamp. In some embodiments, the disk clamp comprises at least three notches and the tool comprises at least three teeth. In some embodiments, the disk clamp applies a uniform pressure on an inner annulus of the at least one disk directly overlying the mounting point.

Also provided herein is an apparatus, comprising a plurality of disk clamp flanges spaced about an inner perimeter of an inner opening of an annular disk clamp; a plurality of disk clamp notches spaced about an outer lip of the annular disk clamp; a plurality of hub flanges alternating with hub voids on a top portion of the outer perimeter of the hub, an annular groove in the outer perimeter of the hub; and a mounting point on the hub for at least one disk, wherein the number of hub voids is greater than or equal to the number of disk clamp flanges, and wherein the disk clamp flanges align with the hub voids to allow for the annular disk clamp to be inserted over the top portion of the hub and to allow the disk clamp flanges into the annular groove of the hub, clamping the at least one disk onto the hub at the mounting point for the at least one disk. In some embodiments, the number of hub voids is equal to the number of disk clamp flanges. In some embodiments, the plurality of disk clamp notches align with a plurality of teeth of a tool for manipulating the disk clamp. In some embodiments, the disk clamp applies a uniform pressure on an inner annulus of the at least one disk directly overlying the mounting point.

Also provided herein is an apparatus, comprising a plurality of disk clamp notches spaced about an outer lip of an annular disk clamp; an annular groove in an outer perimeter of a hub; and a mounting point on the hub for at least one disk, wherein the annular disk clamp occupies the annular groove of the hub, clamping the at least one disk onto the hub at the mounting point for the at least one disk. In some embodiments, a plurality of disk clamp flanges is spaced about an inner perimeter of an inner opening of the annular disk clamp. In some embodiments, a plurality of hub flanges alternates with hub voids on a top portion of the outer perimeter of the hub, operable to accommodate placement of the annular disk clamp in the annular groove of the hub. In some embodiments, the plurality of hub voids align with the plurality of disk clamp flanges to allow for the annular disk clamp to be inserted over the top portion of the hub and the flanges into the annular groove of the hub. In some embodiments, the plurality of disk clamp flanges occupies the annular groove of the hub. In some embodiments, the number of hub voids is greater than or equal to the number of disk clamp flanges. In some embodiments, the plurality of disk clamp notches align with a plurality of teeth of a tool for manipulating the disk clamp. In some embodiments, the disk clamp applies a uniform pressure on an inner annulus of the at least one disk directly overlying the mounting point.

While the invention has been described and/or illustrated by means of various embodiments and/or examples, and while these embodiments and/or examples have been described in considerable detail, it is not the intention of the applicant(s) to restrict or in any way limit the scope of the invention to such detail. Additional adaptations and/or modifications of embodiments of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. An apparatus, comprising:
a hub comprising:
a plurality of hub voids on a top portion of an outer perimeter of the hub;
an annular groove in the outer perimeter of the hub; and
a mounting point for at least one disk; and
a plurality of disk clamp flanges spaced about an inner perimeter of an inner opening of an annular disk clamp;
a plurality of disk clamp notches spaced about an outer lip of the annular disk clamp;
an annular trough between the inner perimeter and the outer lip of the annular disk clamp, wherein a bottom of the annular trough is on a plane different than a plane of the inner perimeter and the outer lip;
a plurality of hub flanges alternating with the hub voids, and operable to accommodate placement of the annular disk clamp;
wherein the plurality of disk clamp flanges occupy at least a portion of the annular groove of the hub, thereby positioning the bottom of the annular trough of the disk clamp in contact with the at least one disk and clamping the at least one disk onto the hub at the mounting point.

2. The apparatus of claim 1, wherein the plurality of hub voids align with the plurality of disk clamp flanges to allow for the annular disk clamp to be inserted over the top portion of the hub and the flanges into the annular groove of the hub.

3. The apparatus of claim 2, wherein the number of hub voids is greater than or equal to the number of disk clamp flanges.

4. The apparatus of claim 3, wherein the number of hub voids is equal to the number of disk clamp flanges.

5. The apparatus of claim 4, wherein the number of hub voids and the number of disk clamp flanges is at least three.

6. The apparatus of claim 1, wherein the plurality of disk clamp notches align with a plurality of teeth of a tool for manipulating the disk clamp.

7. The apparatus of claim 6, wherein the disk clamp comprises at least three notches and the tool comprises at least three teeth.

8. The apparatus of claim 1, wherein the bottom of the annular trough of the disk clamp applies a uniform pressure on an inner annulus of the at least one disk directly overlying the mounting point.

9. An apparatus, comprising:
a hub comprising:
a plurality of hub voids on a top portion of an outer perimeter of the hub;
an annular groove in the outer perimeter of the hub; and
a mounting point for at least one disk; and
a plurality of disk clamp flanges spaced about an inner perimeter of an inner opening of an annular disk clamp;
a plurality of disk clamp notches spaced about an outer lip of the annular disk clamp;
an annular trough between the inner perimeter and the outer lip of the annular disk clamp, wherein a bottom of the annular trough is on a plane different than a plane of the inner perimeter and the outer lip;
a plurality of hub flanges alternating with the hub voids
wherein a number of hub voids is greater than or equal to the number of disk clamp flanges, and
wherein the disk clamp flanges align with the hub voids to allow for the annular disk clamp to be inserted over the top portion of the hub and to allow the disk clamp flanges into the annular groove, thereby positioning the bottom of the annular trough of the disk clamp in contact with the at least one disk and clamping the at least one disk onto the hub at the mounting point.

10. The apparatus of claim 9, wherein the number of hub voids is equal to the number of disk clamp flanges.

11. The apparatus of claim 9, wherein the plurality of disk clamp notches align with a plurality of teeth of a tool for manipulating the disk clamp.

12. The apparatus of claim 9, wherein the disk clamp applies a uniform pressure on an inner annulus of the at least one disk directly overlying the mounting point.

13. An apparatus, comprising:
a hub comprising:
an annular groove in the outer perimeter of the hub; and
a mounting point for at least one disk; and
a plurality of disk clamp notches spaced about an outer lip of an annular disk clamp;
an annular trough between an inner perimeter of the annular disk clamp and the outer lip, wherein a bottom of the annular trough is on a plane different than a plane of the inner perimeter and the outer lip;
wherein the annular disk clamp occupies at least a portion of the annular groove, thereby positioning the bottom of the annular trough of the disk clamp in contact with the at least one disk and clamping the at least one disk onto the hub at the mounting point.

14. The apparatus of claim 13, wherein a plurality of disk clamp flanges is spaced about an inner perimeter of an inner opening of the annular disk clamp.

15. The apparatus of claim 14, wherein a plurality of hub flanges alternates with hub voids on a top portion of the outer perimeter of the hub, operable to accommodate placement of the annular disk clamp in the annular groove of the hub.

16. The apparatus of claim 15, wherein the plurality of hub voids align with the plurality of disk clamp flanges to allow for the annular disk clamp to be inserted over the top portion of the hub and the flanges into the annular groove of the hub.

17. The apparatus of claim 14, wherein the plurality of disk clamp flanges occupies at least a portion of the annular groove of the hub.

18. The apparatus of claim 14, wherein the number of hub voids is greater than or equal to the number of disk clamp flanges.

19. The apparatus of claim 13, wherein the plurality of disk clamp notches align with a plurality of teeth of a tool for manipulating the disk clamp.

20. The apparatus of claim 13, wherein the bottom of the annular trough of the disk clamp applies a uniform pressure on an inner annulus of the at least one disk directly overlying the mounting point.

* * * * *